United States Patent [19]

Singh et al.

[11] Patent Number: 5,118,053
[45] Date of Patent: Jun. 2, 1992

[54] PRESSURE EQUALIZATION SYSTEMS

[75] Inventors: Ashok K. Singh, Briar; Scott E. Coburn, Renton, both of Wash.

[73] Assignee: The Boeing Company, Seattle, Wash.

[21] Appl. No.: 413,330

[22] Filed: Sep. 27, 1989

[51] Int. Cl.⁵ .............................................. B64D 13/04
[52] U.S. Cl. ............................ 244/118.5; 244/129.1; 454/71
[58] Field of Search .......................... 244/118.5, 129.1; 98/1.5

[56] References Cited

U.S. PATENT DOCUMENTS

| 2,679,467 | 5/1954 | Sherts . |
|---|---|---|
| 3,453,777 | 7/1969 | Reilly . |
| 3,571,977 | 3/1971 | Abeel . |
| 3,775,915 | 12/1973 | Chambers et al. . |
| 3,861,080 | 1/1975 | Schibli et al. . |
| 3,938,764 | 2/1976 | McIntyre et al. . |
| 4,022,117 | 5/1977 | Mallian . |
| 4,033,247 | 7/1977 | Murphy . |
| 4,133,852 | 1/1979 | Di Nicolantonio et al. . |
| 4,383,666 | 5/1983 | Allerding et al. . |
| 4,390,152 | 6/1983 | Jorgensen . |
| 4,432,514 | 2/1984 | Brandon . |
| 4,646,993 | 3/1987 | Baetke .......................... 244/118.5 X |
| 4,703,908 | 11/1987 | Correge et al. ................. 244/118.5 |

FOREIGN PATENT DOCUMENTS 2306877 11/1976 France .
470790 4/1952 Italy .

Primary Examiner—Margaret A. Focarino
Assistant Examiner—James M. Kannofsky
Attorney, Agent, or Firm—Hughes & Multer

[57] ABSTRACT

A system for preventing the sudden depressurization of a compartment in an aircraft from causing structural damage or damage to other critical aircraft components. The system includes a pivotable closure. Normally, this closure is latched across a passage between a pressurized compartment such as a passenger cabin and a dump such as the space between the cabin wall and the outer skin of the aircraft. In the event that pressure is suddenly lost in a second pressurized compartment such as a cargo hold beneath the floor of the passenger compartment, a pressure differential is created across a flap-type latch actuator carried by the closure. This rotates the actuator, disengaging an actuator-associated latch element from a fixedly mounted keeper and thereby allowing the closure to be swung to an open position by outrushing air. This makes the entire area of the passage to the dump available for the outflow of air. As a consequence, the pressure between the two compartments is rapidly equalized, keeping the floor of the passenger compartment from collapsing and preventing damage to critical aircraft components routed beneath the floor or through the aircraft body such as control cables, electrical leads, and hydraulic lines.

7 Claims, 5 Drawing Sheets

PRESSURE EQUALIZATION SYSTEMS

TECHNICAL FIELD OF THE INVENTION:

The present invention relates to novel, improved systems which keep the sudden decompression of a compartment in an aircraft body from collapsing a floor or other wall between that compartment and a pressurized compartment on the other side of the wall and from damaging components such as electrical leads, control cables, and hydraulic lines routed through the aircraft body adjacent the dividing wall.

BACKGROUND OF THE INVENTION

Modern, commercial jet aircraft are designed to fly at altitudes where the air is too thin to support human life, let alone dense enough to allow passengers to travel in comfort. Also, at these high altitudes, cargo exposed to the ambient pressure might well be damaged or destroyed. Consequently, the cargo, baggage, and passenger compartments of aircraft of this character are almost always pressurized.

Decompression of a pressurized compartment in a jet aircraft is not unknown. In one highly publicized incident in recent years, a cargo hatch was lost in flight, causing almost instantaneous decompression from a below deck baggage compartment. This resulted in a pressure differential across the floor of a passenger compartment above the cargo hold which, while perhaps not large, was applied to a relatively large area. This resulted in the floor of the passenger compartment being forced downwardly, damaging control cables routed beneath that floor. As a result, the pilots lost control of the aircraft which ultimately crashed with a disastrous loss of life.

Partially because of this highly publicized accident, governmental agencies in a number of countries have enacted regulations requiring that aircraft with pressurized compartments be constructed so that even extremely rapid decompression of one or more compartments can be safely accommodated.

One approach to guaranteeing safe decompression employs a panel or other closure which will automatically open if decompression occurs, providing a communicating passage of large cross-sectional area between the depressurized compartment and any compartment(s) which remain pressurized. This allows air to flow from the pressurized compartment(s) into the depressurized compartment fast enough that differential pressures on wall or floor structures between the thus communicated compartments will not build up to a level at which the dividing wall or critical aircraft components routed adjacent that structure might occur.

Pressure equalization systems of the character just described are disclosed in: U.S. Pat. Nos. 3,938,764 issued 17 Feb. 1986 to McIntyre et al. for FRANGIBLE AIRCRAFT FLOOR; U.S. Pat. No. 4,033,247 issued 5 Jul. 1977 to Murphy for VENT STRUCTURE: U.S. Pat. No. 4,383,366 issued 17 May 1983 to Allerding for SAFETY CONSTRUCTION FOR AIRCRAFT; U.S. Pat. No. 4,390,152 issued 28 Jun. 1983 to Jorgensen for AIRCRAFT DECOMPRESSION VENT ASSEMBLY; U.S. Pat. No. 4,432,514 issued 21 Feb. 1984 to Brandon DECOMPRESSION EQUALIZATION RELIEF VALVE; and in French patent No. 2,906,877 dated 5 Nov. 1976, and entitled DISPOSITIF DE SECURITE CONTRE DECOMPRESSION BRUT ALE DE SOUTES-D'AERONEFS Typical, heretofore proposed pressure equalization systems of the type under discussion have employed folding or hinged vent panels or other configurations which allow foreign material to collect and interfere with the proper functioning of the system. Often, such systems are also complicated and therefore expensive, bulky, heavy, and difficult to install and remove for servicing.

SUMMARY OF THE INVENTION

We have now invented, and disclosed herein, a novel pressure equalization system which is like those heretofore proposed in that it includes a closure which is automatically opened when decompression occurs to equalize the pressure between the decompressed aircraft compartment and a pressurized compartment with sufficient rapidity to prevent structural damage to a wall, floor, or deck between the two compartments or to critical aircraft components routed adjacent the dividing wall. However, our novel systems differ from those of this type heretofore proposed in that they are simple, compact, relatively inexpensive, light, easy to install and remove for servicing, and otherwise superior to the heretofore proposed ones.

In general, the pressure equalization system employing the principles of the present invention include a cover or closure member normally oriented in a closed position in which it blocks flow through a passage of relatively large cross-sectional area. This passage is typically formed in the side wall of a passenger compartment and provides pressure equalization air flow communication from that compartment through a dump between the passenger compartment side wall and the outer skin of the aircraft to a below-deck cargo compartment. This space or dump also serves as a return duct for heating and conditioning air supplied to the passage or compartment. To accommodate this dual function, a perforated grill and associated duct are set into the closure in surrounding relationship to an opening through that component. The closure is biased to its normal closed position and retained in that position by a simple latch arrangement which includes: a keeper supported from the floor of the aircraft passenger compartment, a flap-type latch actuator, an actuator-carried latch, and a spring arrangement which urges the actuator toward the closure of the system to engage the latch with its keeper.

Decompression of the aircraft's baggage compartment, for example, creates a pressure differential across the latch actuator, pivoting it away from the associated closure of the pressure equalization system and disengaging the latch from its keeper. This allows the pressure differential-generated force across the actuator and the pivotable closure to thereafter swing the closure away from that end of the pressure equalization passage which it normally covers. This greatly increases the rate at which air can flow from the still pressurized passenger compartment toward the decompressed aircraft compartment. As a consequence, the pressure between those two compartments is rapidly equalized, preventing damage to a floor or other wall structure therebetween or to critical aircraft components routed along that wall.

Once the pressure is equalized, a first spring system restores the closure to its normal operating or closed position and a second spring system pivots the latch actuator toward the closure member, reengaging the actuator-carried latch with its stationary keeper to hold the closure member in place.

OBJECTS OF THE INVENTION

From the foregoing, it will be apparent to the reader that one important and primary object of the present invention resides in the provision of novel, improved systems for equalizing the pressure between a decompressed compartment of an aircraft and a still pressurized compartment (or compartments), thereby preventing damage to a wall between those compartments or to aircraft components routed therealong.

Other, also important but more specific objects of the invention reside in the provision of systems as described in the preceding object:

which are relatively simple;

which are comparatively light;

which are relatively compact and thereby conserve space;

which, in conjunction with the preceding object, have the advantage that they can be installed without protruding into the interior of an aircraft passenger compartment;

which are relatively inexpensive;

which are easy to install and remove; and which have a pivotably mounted closure member with a grill through which air can flow during normal operation and an actuator which is operated by a pressure-generated force when decompression of a compartment occurs to disengage a latch and allow the pressure differential to swing the closure away from and uncover a relatively large flow passage, thereby allowing air to escape from the still pressurized component with specific rapidity to prevent damage to structural or other critical components.

Other important objects and features and additional advantages of the invention will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
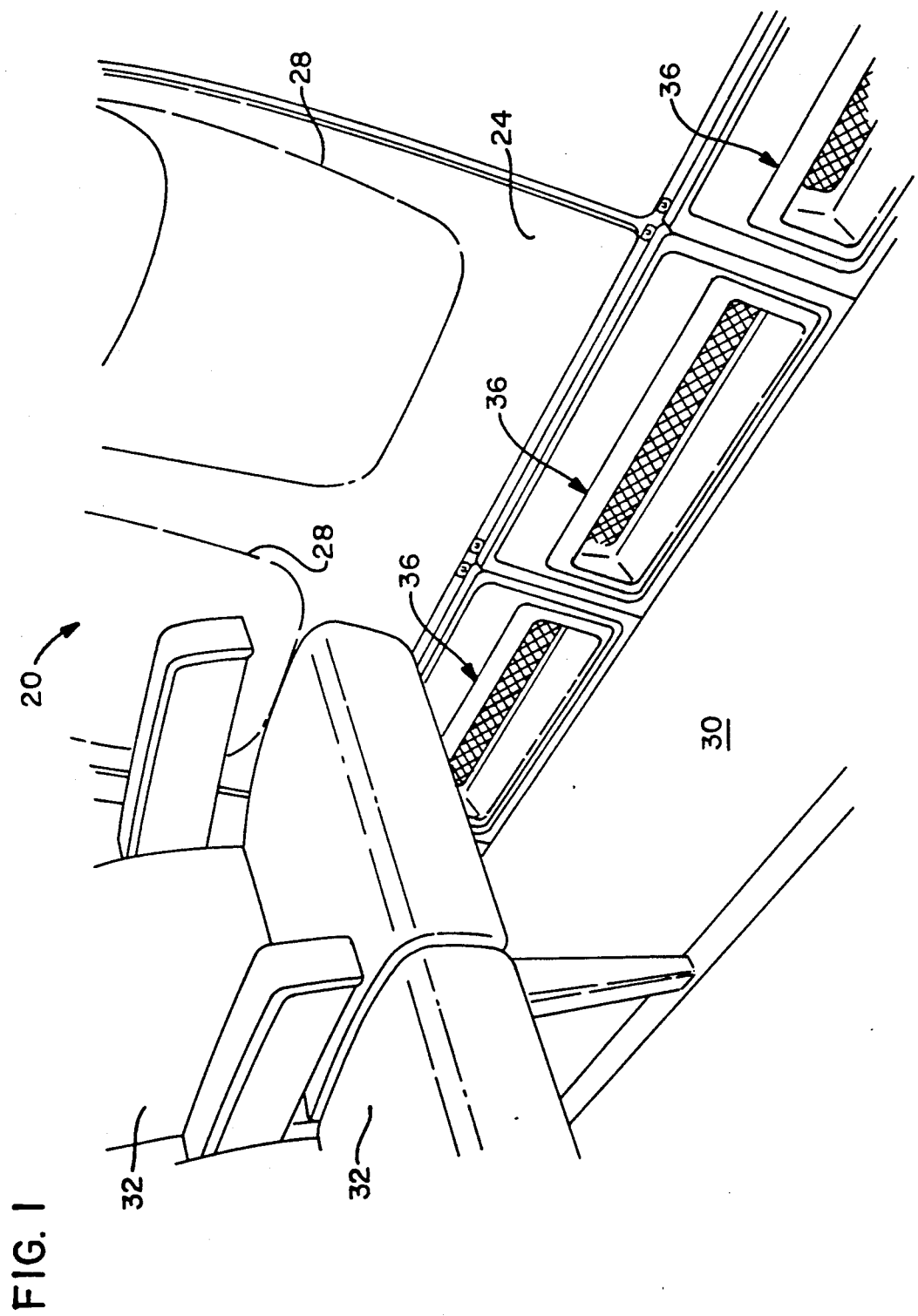
FIG. 1 is a pictorial view of the interior of an aircraft which is equipped with a pressure equalization system embodying the principles of the present invention to keep depressurization of a cargo compartment from collapsing or otherwise damaging the floor of the pressure compartment or damaging control cables, electrical leads, hydraulic lines, or other components routed through the aircraft body or beneath the floor.
Figure 2:
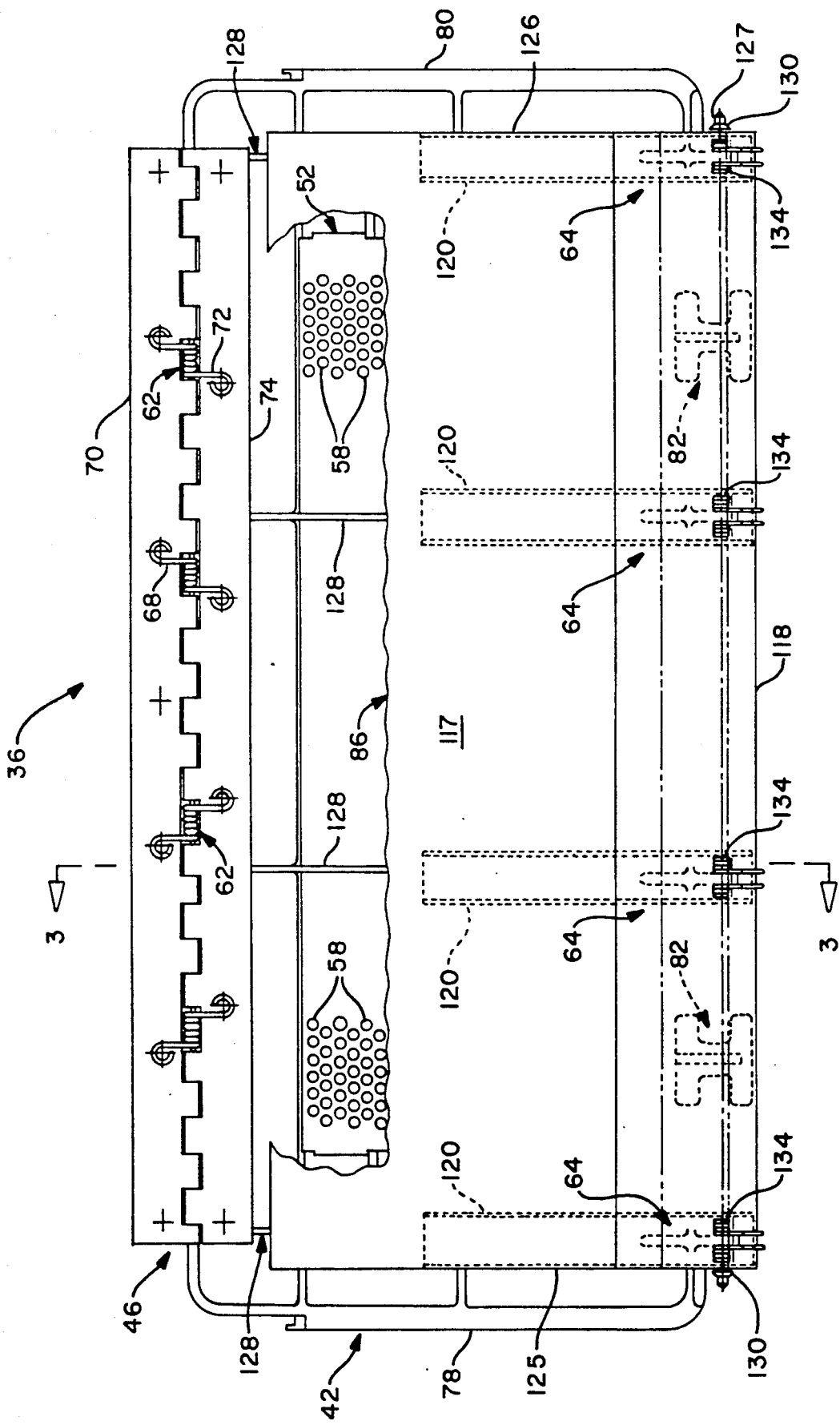
FIG. 2 is a front view of a vent panel and associated components employed in the pressure equalization system of FIG. 1.
Figure 3:
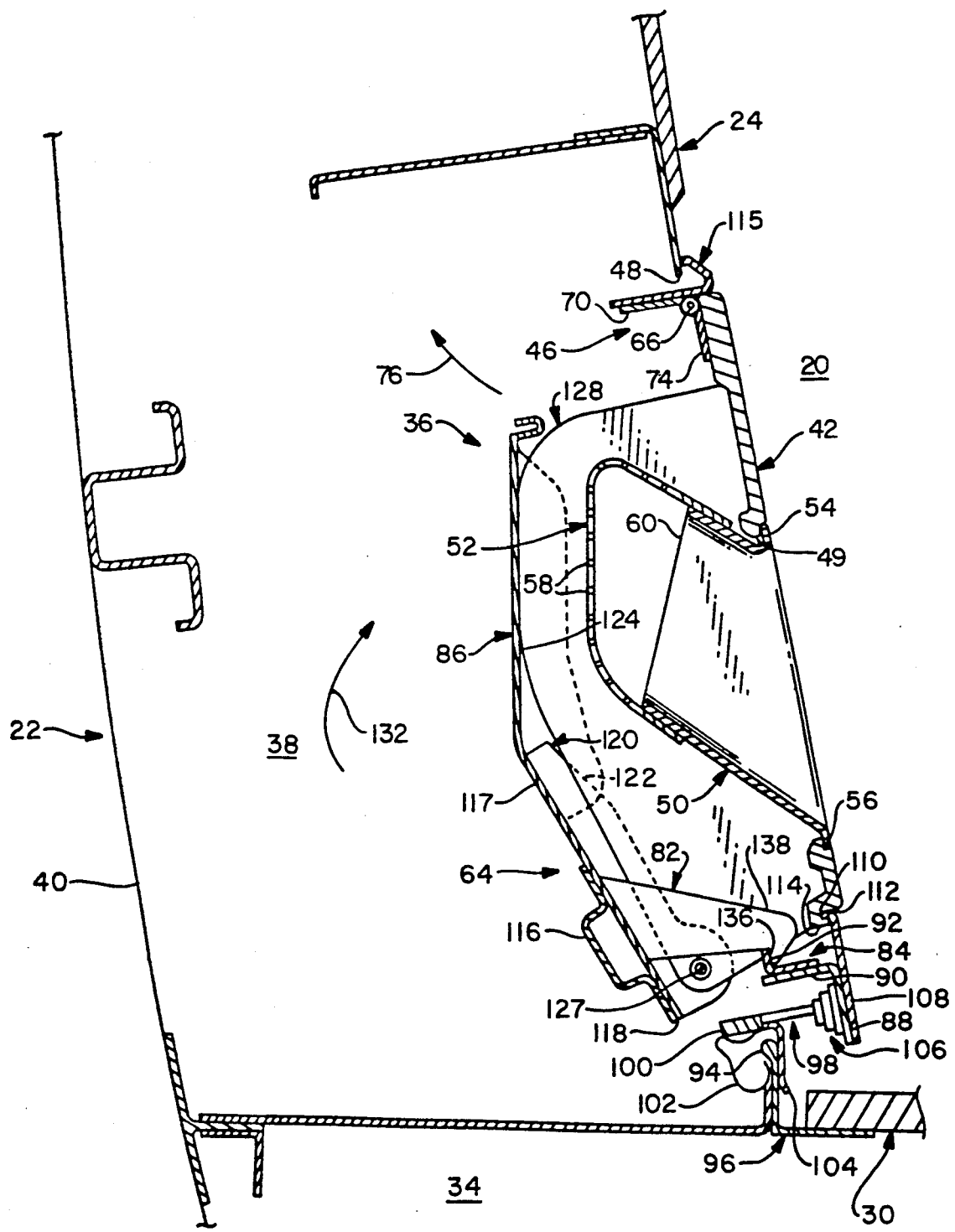
FIG. 3 is a section through the vent panel of FIG. 2, taken substantially along line 3—3 of FIG. 2 and showing the vent panel in a closed position.
Figure 4:
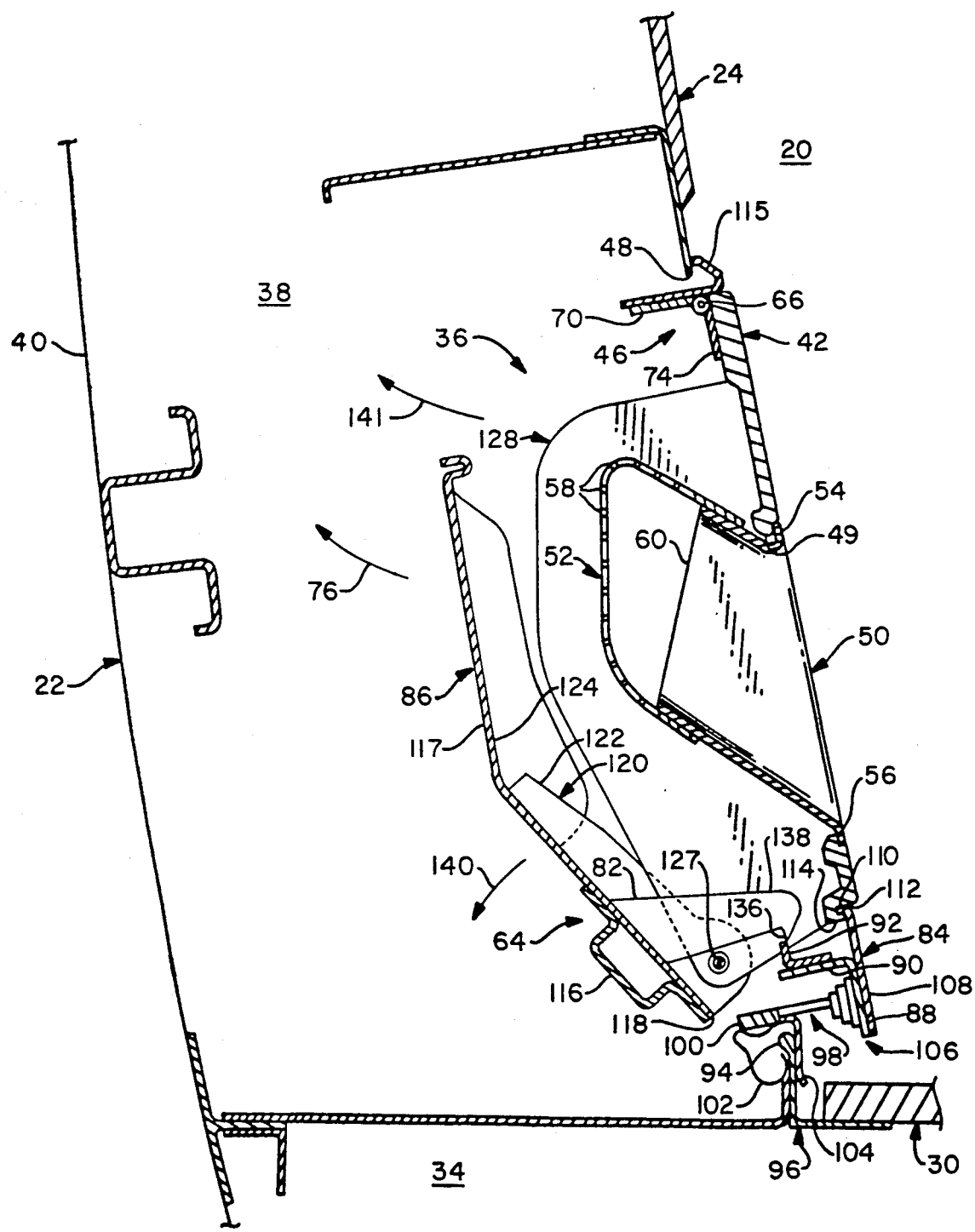
FIG. 4 is view similar to FIG. 3 but showing a latch mechanism employed to keep the vent panel in the closed position disengaged by application of a decompression generated pressure differential to the vent panel.

Referring now to the drawing, FIG. 1 depicts a passenger cabin 20 in an aircraft body or fuselage 22 (see FIGS. 2-4). Cabin 20 has the usual interior walls 24 (only one of which is showing) with windows 28 and a floor 30 on which passenger seats 32 are supported. On the other side of, and beneath, floor 30, is a cargo hold or baggage compartment identified generally by reference character 34.

Also incorporated in, and a salient feature of, the aircraft just briefly described is a series of pressure relief or equalization systems 36 constructed in accord with, and embodying, the principles of the present invention. It is the function of these novel systems 36 to accommodate a rapid flow of air from pressurized passenger compartment 20 into a relatively large volume dump 38 between interior chain wall 24 and the outer skin 40 of the aircraft (see FIG. 3) if there is a sudden loss of pressure in (i.e., decompression of) cargo hold or baggage compartment 34. As discussed above, this results in a rapid equalization of pressure between passenger compartment 20 and cargo hold 34. That prevents the buildup of pressure differential-generated forces which might collapse or otherwise damage passenger compartment floor 30 or produce catastrophic results by damaging such vital components as control cables, electrical leads, and hydraulic lines routed beneath and adjacent floor 30.

Referring now most specifically FIGS. 2-5, each of the novel systems 36 discussed briefly above includes an elongated closure or panel 42. This component of system 36 is pivotably supported from cabin wall 24 by a hinge 46 which extends generally from end-to-end of the closure member as shown in FIG. 2. This hinge-type mounting arrangement allows panel 42 to be displaced from a closure position (see FIG. 3) in which the panel covers a passage 48 between passenger compartment 20 and dump 38 and an open position (see FIG. 4) in which air can flow in large volume through passage 48 into dump 38 from passenger compartment 20. This rapidly reduces the pressure in the pressurized passenger compartment to a level near or approaching that in the decompressed cargo hold 34, thus keeping forces of sufficient magnitude to cause structural or other damage from being exerted on passenger compartment floor 30 or components routed beneath that floor or through the aircraft body.

In normal operation of the aircraft partially shown in pictorial form in FIG. 1, dump 38 also serves as a return duct for heating and conditioning air supplied to cabin 20. In this mode of operation, panel 42 is in the closed position shown in FIG. 3; and air flows into dump 38 from cabin 20 through a central opening 49 in panel 42, a duct 50 mounted on the panel, and a grill 52 at the discharge end of duct 50.

Duct 50 is a tubular component with a generally rectangular cross section. It is fitted into the opening 49 through closure 42. A flange 54 at the outer end of the duct is seated in a recess 56 surrounding the opening 49 in panel 42.

Grill 52 has a set of apertures 58 therethrough and a configuration matching that of duct 50. It is installed on the inner end 60 of the duct as indicated above and shown in FIGS. 3-5.

Thus, in the normal operation of the aircraft, return air flows from cabin 20 through opening 49, duct 50, and the apertures 58 in grill 52 into dump/return duct 38.

In this mode of operation, closure 42 is held in the closed position shown in FIG. 3 against the bias exerted by coil springs 62 and retained in that position by a set of four, essentially identical latch assemblies, each identified generally by reference character 64.

As is best shown in FIG. 2, the biasing springs 62 just discussed are supported on the pin 66 of closure-supporting hinge 46 at locations spaced therealong with one end 68 of each spring fixed to the structural member-associated leaf 70 of the hinge and the other end 72 of the spring fixed to the cooperating leaf 74 from which closure 42 is supported. As a result, each of the hinges 62 exerts on closure member 42 a force which acts in the direction indicated by arrow 76 in FIGS. 3-5 to urge panel 42 toward its open position.

Figure 5:
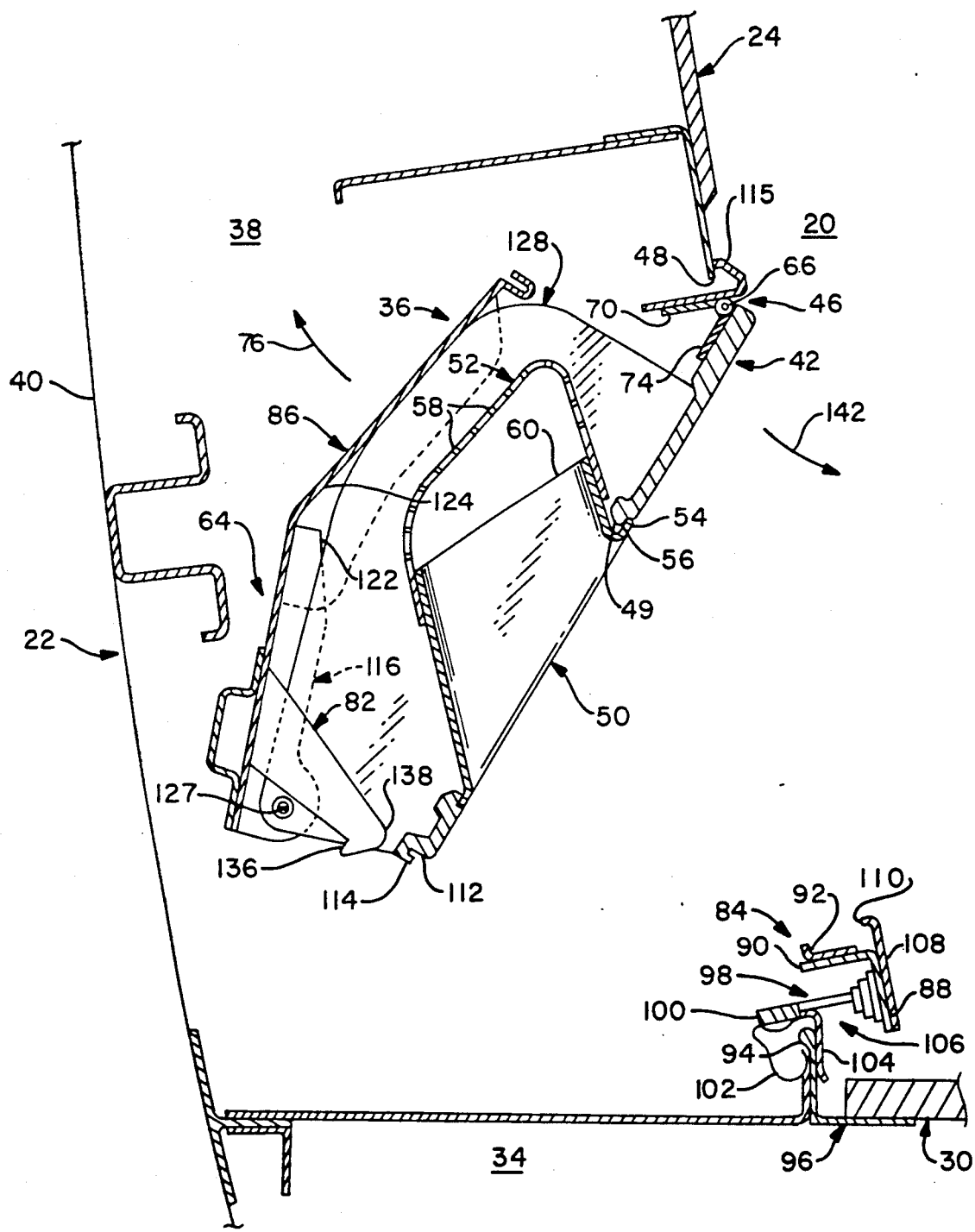
FIG. 5 is a view similar to FIGS. 3 and 4 but with the vent panel biased open to create a path through which air can flow out of a second, pressurized chamber with sufficient rapidity to avoid the collapse of or damage to a wall between the pressurized and decompressed compartments or damage to components routed adjacent that wall.

Referring still to FIGS. 3-5, the four latch assemblies 64 are spaced equidistantly along closure 42 with two of the latch assemblies at opposite ends 78 and 80 of the closure. Near, and at opposite ends of, latch assemblies 64 are latches 82; and there are a keeper 84 and actuator 86 which extend generally from end-to-end of closure 42 and are common to all four latch assemblies 64.

Keeper 84 is a sheet metal component having integral, normally oriented legs 88 and 90 and a vertically extending, latch lip 92 at the inner end of leg 90. The keeper is supported from the vertical segment 94 of a structural floor component 96 by the keeper support assembly 98 shown in FIGS. 3-5. That assembly includes an elongated bracket 100; an elongated spring clip 102 and seal 104 which embrace the opposite sides of structural support segment 94 and support bracket 100 therefrom; and support assemblies identified generally by reference character 106. These support the keeper from bracket 100.

Fixed to the support-associated leg 88 of keeper 84 is an elongated, sheet metal stop 108 with an inwardly directed lip 110. As closure 42 is pivotably displaced to, and reaches, the closed position shown in FIG. 3, lip 110 is seated in a complementary recess 112 at the lower edge 114 of closure 42. This keeps closure 42 from traveling in the counterclockwise direction beyond the desired, illustrated, closed position shown in FIG. 3.

Stop 108, bracket 100, seal 104, structural floor component 94 and a seal 115 to which the leaf 70 of panel supporting hinge 46 is attached also cooperate to keep air from leaking past panel 42 into flow passage 48.

Referring still to FIGS. 2-5, the latch actuator 86 of each latch assembly 64 is an elongated, sheet metal stop which extends generally from end-to-end of closure 42 as is best shown in FIG. 2. To make it more rigid, a channel 116 is preferably fixed to the rear side 117 of the actuator adjacent its lower edge 118.

Four channels 120 with tapered side walls 122 are fixed to the front side 124 of actuator 86. As shown in FIG. 2, these channels are located at the opposite ends 125 and 126 of actuator 26 and at two equidistant, intermediate locations.

Latch actuator 86 is pivotably supported from closure 42 for rotation about an axis parallel to the axis of rotation of hinge pin 66 and at the lower edge 114 of the closure by an elongated pivot pin 127. This pin extends through the flanges 122 of the four actuator associated channels 120 and generally C-shaped supports 128 fixed to the rear side 129 of panel 42. Hinge pin 127 is retained in place as by keepers 130 (see FIG. 2).

Actuator 86 is biased or urged toward closure 42 in the clockwise direction indicated by arrow 132 in FIG. 3 by four coil springs 134. These springs are supported on and surround pivot pin 127 at locations corresponding to those of the actuator-supporting and -bracing channels 120 in which they are disposed.

With latch actuator 86 biased toward closure 42 as indicated by arrow 132, the two latches 82 of the four latch assemblies 64 are urged over the two latch lips 92 of keepers 84 until lips 92 are seated in the notches 138 in the free ends 138 of latches 82, thereby latching closure 42 in the closed position shown in FIG. 3.

In the event of a sudden reduction of pressure in cargo compartment 34, the pressure in dump 38 will almost immediately drop to the same pressure. However, because the flow of air from the still pressurized passenger compartment 20 into dump 38 is limited by the relatively small flow area provided by the apertures 58 in grill 52, the pressure in the passenger compartment will decrease only slowly as long as those apertures furnish the only egress for air from the passenger compartment. As a result, the pressures on opposite sides of the flap-like latch actuator 86 will be unequal, generating a force which will rotate the actuator in the counterclockwise direction indicated by arrow 140 in FIG. 4 against the bias exerted by coil springs 134. This continues until the hooklike, free ends 138 of the latches 82 clear the lip 92 of keeper 84.

This disengagement of latches 82 from keeper 84 frees closure 42 for rotation about hinge pin 66 in the clockwise direction indicated by arrow 141. Thereafter, the force attributable to the pressure differential across latch actuator 86, closure 42, and the grill 52 at the inner end 60 of duct 50 will rotate closure 42 in that direction from the closed position of FIG. 4 to the open position shown in FIG. 5, exposing passage 48. Then, air can flow at a high rate from passenger cabin 20 through the large area of passage 48 into dump 38 and cargo compartment 34. This allows the pressure between the two compartments to equalize in a sufficiently short period of time to prevent the imposition of unacceptable stresses on the floor 30 of the passenger compartment.

As the pressures in the two compartments 20 and 34 equalize and the pressure differential across the component of each flow equalization system 36 equalizes, the force available to maintain closure 42 in an open position shown in FIG. 5 by the coil springs 62 surrounding hinge pin 66 will continue. Manually moving the closure 42 against the bias exerted by coil springs 62 in the counterclockwise direction indicated by arrow 142 in FIG. 5 to the closed and latched position depicted in FIG. 3 will restore the closure 42 to its original setting.

As suggested by FIG. 1; a series of pressure equalization systems 36 of the character just described are preferably installed on each side of passenger compartment 20. This generates sufficient flow passage capacity to accomplish pressure equalization with the speed needed to prevent damage to floor 30 and/or any critical components routed beneath that floor or through the aircraft body.

While the principles of our invention have above been developed with respect to an aircraft having an above-deck passenger compartment and a below-deck cargo compartment, the applications of the invention are by no means restricted to aircraft of this particular type. For example, it will be obvious to those skilled in the technical field to which this invention relates that our invention may well be employed in all-cargo aircraft, for example.

The invention may be embodied in still other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. The combination of an aircraft body having: a first pressurizable compartment, a second pressurizable compartment, wall means between said first and second compartments, and dump means to which air can flow from the first of said compartments with means automatically operable coincident with a sudden decrease of the pressure in the second compartment to increase the area of a flow path between said first compartment and said dump means and thereby allow the pressure between the first and second compartments to equalize with sufficient rapidity to prevent the differential in pressure between the first and second compartments from exerting on said wall means a force of a high enough magnitude to collapse or otherwise damage said wall means or components of the aircraft in the proximity of said wall means, there being a passage between said first compartment and said dump means, a closure means spanning said passage, means so mounting said closure means for pivotable movement about one edge thereof relative to said aircraft body that air can flow from said first compartment to said dump means at a high rate when said closure means is pivoted to an open position, an opening through said closure means for accommodating the flow of return heating and/or conditioning air from said first compartment to said dump means at a lower rate in the absence of the decompression of the second compartment, and means for conducting air from said opening to said dump means at said lower rate comprising a duct having an inner, return air discharge end and an outer, return air inlet end, the outer end of said duct being fixed to said closure means in surrounding relationship to the opening through the closure means and said flow accommodating means also including an apertured grill which spans and is fixed to said duct at the inner, discharge end thereof.

2. The combination of an aircraft body having a first pressurizable compartment, a second pressurizable compartment, wall means between said first and second compartments, and a dump means to which air can flow from the first of said compartments with means automatically operable coincident with a sudden decrease of the pressure in the second compartment to increase the area of the flow path between said first compartment and said dump means and thereby allow the pressure between the first and second compartments to equalize with sufficient rapidity to prevent the differential in pressure between the first and second compartments from collapsing or otherwise damaging said wall means or components of the aircraft in the proximity of said wall means, there being a passage between said dump means and the means for increasing the area of the flow path between the first compartment and the dump means comprising: a closure means spanning said passage, means mounting said closure means or pivotable movement about one edge thereof relative to said aircraft body, a latch means having one component fixed relative to said aircraft body and a second component which is fixed to said closure means at an edge thereof opposite said one edge and is so engageable with said first component that said sudden decrease in pressure will create a pressure differential between the first and dump means of sufficient magnitude to disengage said second latch component from the first latch component and a rotation of said closure means about said mounting means to an open position in which essentially the full area of said passage is available for the pressure equalizing flow of air form said first compartment to said dump means, there being an opening through said closure means and the combination also including means for accommodating the flow of air from said second compartment into said dump means at a lower rate that comprises a duct having an inner, return air discharge end and an outer, return air inlet end, the outer end of said duct being fixed to said closure means in surrounding relationship to the opening through the closure means and said means for accommodating the flow of air through the closure means at the lower rate also including an apertured grill which spans and is fixed to said duct at the inner, discharge end thereof.

3. A combination as defined in claim 2, which includes an actuator which carries the second component of the latch means and is pivotably supported from said closure member and means that is continuously operable to bias said actuator relative to said closure member and toward said closure means and thereby promote engagement of the first and second latch components.

4. The combination of an aircraft body having a first pressurizable compartment, a second pressurizable compartment, wall means between said first and second compartments, and a dump means to which air can flow from the first of said compartments with means automatically operable coincident with a sudden decrease of the pressure in the second compartment to increase the area of the flow path between said first compartment and said dump means and thereby allow the pressure between the first and second compartments to equalize with sufficient rapidity to prevent the differential in pressure between the first and second compartments from collapsing or otherwise damaging said wall means or components of the aircraft in the proximity of said wall means, there being a passage between said dump means and the means for increasing the area of the flow path between the first compartment and the dump means comprising: a closure means spanning said passage, means mounting said closure means for pivotable movement about one edge thereof relative to said aircraft body, a latch means having one component fixed relative to said aircraft body and a second component which is fixed to said closure means at an edge thereof opposite said one edge and is so engageable with said first component that said sudden decrease in pressure will create a pressure differential between the first compartment and the dump means of sufficient magnitude to disengage said second latch component from the first latch component and effect a rotation of said closure means about said mounting means to an open position in which essentially the full area of said passage is available for the pressure equalizing flow of air form said first compartment to said dump means, said latch means including an elongated, non-hinged, flap-type actuator and mounting means pivotably fixing said actuator to said closure means for pivotable movement about a second axis located at said opposite edge of the closure means and said first latch component being carried by said actuator, whereby a sudden decompression of said second compartment as aforesaid will so create a pressure differential across said actuator as to rotate the actuator about said second axis and disengage said first latch component form said second latch component and allow said closure means to be rotatably displaced to said open position by the pressure differential-generated force as aforesaid.

5. The combination of an aircraft body having a first pressurizable compartment, a second pressurizable compartment, wall means between said first and second compartments, and dump means to which air can flow from the first of said compartments with means automatically operable coincident with a sudden decrease of the pressure in the second compartment to increase the area of the flow path between said first compartment and said dump means and thereby allow the pressure between the first and second compartments to rapidly equalize and prevent the collapse of or damage to said wall means or components of the aircraft in the proximity of said wall means, there being a duct providing a flow passage between said first compartment and said dump means with a return air inlet at the duct end nearest the first compartment and a return air outlet at the opposite duct end and the automatically operable means including a closure means spanning said passage, means mounting said closure means for pivotable movement about one edge thereof relative to said aircraft body, and a latch means having one component fixed relative to said aircraft body and a second component which is fixed to said closure means at an edge thereof opposite said one edge and is so engageable with said first component that said sudden decrease in pressure will create a pressure differential between the first compartment and the dump means of sufficient magnitude to disengage said second latch component from the first latch component and enable a rotation of said closure means about said mounting means to an open position in which essentially the full area of said passage is available for the pressure equalizing flow of air from said first compartment to said dump means and said combination further comprising means in said closure means through which conditioning or heating air can be discharged when said closure means is in the closed position and an apertured grill which spans and is fixed to the opposite end of said duct and controls the flow of air from the first compartment through the passage to said dump means.

6. A combination as defined in claim 5, wherein the flow area increasing means includes an elongated actuator, mounting means pivotably fixing said actuator to said closure means for pivotable movement about an axis located at said opposite edge of the closure means, and wherein said first latch component is fixed to said actuator, whereby a sudden decompression as aforesaid will so create a pressure differential across said actuator as to rotate said actuator about said mounting means and displace said first latch component away from said second latch component to disengage it therefrom and allow said closure means to be rotatably displaced to said open position as aforesaid.

7. A combination as defined in claim 6, which includes means that is continuously operable to bias said actuator relative to and toward said closure means and thereby promote engagement between the first and second latch components.

* * * * *